2 Sheets—Sheet 1.

P. FRANCIS.
ANIMAL TETHERS.

No. 181,063. Patented Aug. 15, 1876.

Witnesses.
J. H. Burridge
Thomas J. McGarry

Inventor.
P. Francis
Per Burridge & Co.
Attys.

N. PETERS, PHOTO-LITHOGRAPHER, WASHINGTON, D. C.

2 Sheets—Sheet 2.

P. FRANCIS.
ANIMAL TETHERS.

No. 181,063.  Patented Aug. 15, 1876.

Witnesses.
J. H. Burridge
Thomas J. McGarry

Inventor:
P. Francis
Per Burridge & Co.
Attys.

UNITED STATES PATENT OFFICE.

PHYLETUS FRANCIS, OF CLEVELAND, OHIO.

IMPROVEMENT IN ANIMAL-TETHERS.

Specification forming part of Letters Patent No. 181,063, dated August 15, 1876; application filed June 8, 1876.

*To all whom it may concern:*

Be it known that I, PHYLETUS FRANCIS, of Cleveland, in the county of Cuyahoga and State of Ohio, have invented new and useful Improvements in Tethers, of which the following is a description, reference being had to the accompanying drawings, making a part of this specification, in which—

Figure 1:
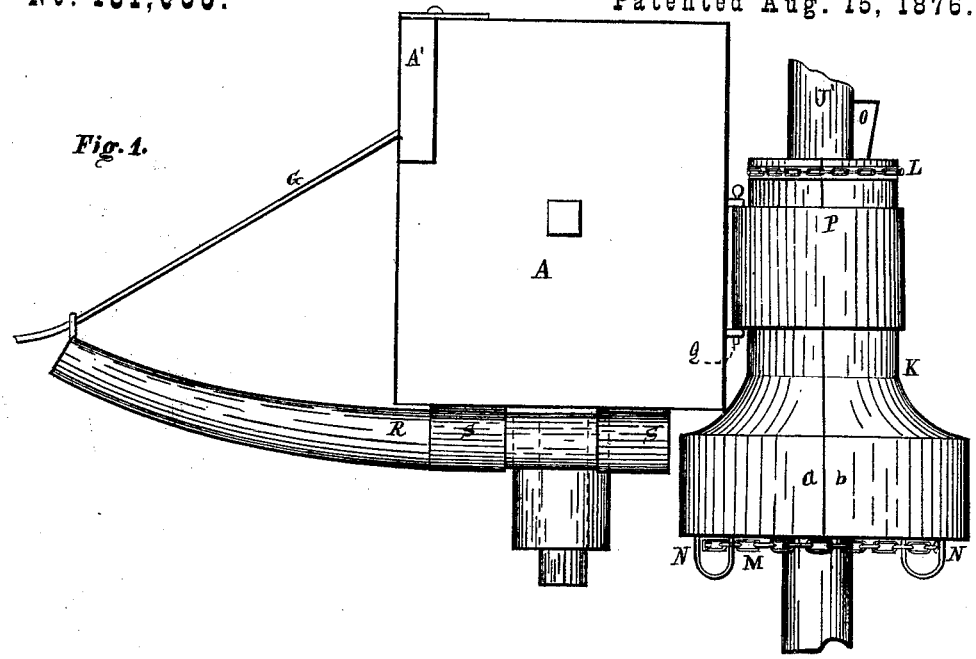
Figure 2:
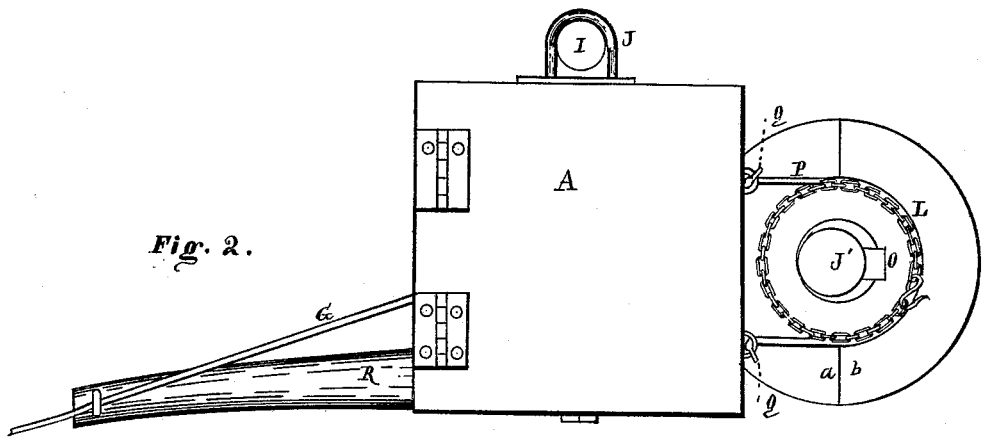
Figure 3:
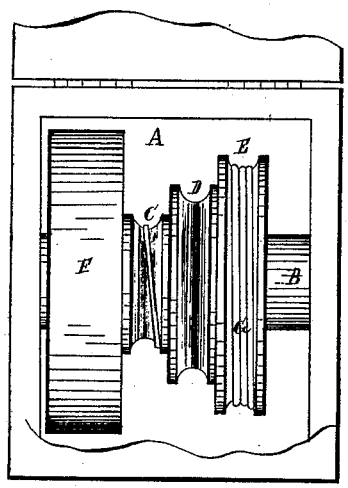
Figure 4:
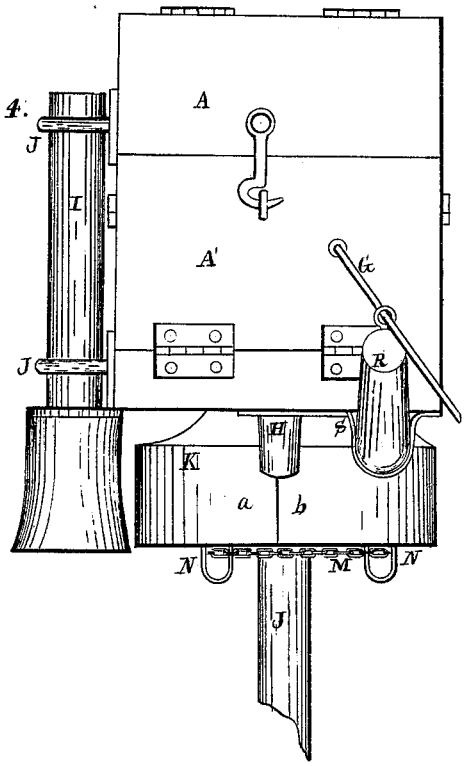

Figure 1 is a side view of the tether. Fig. 2 is a plan view. Fig. 3 is a view of the inside. Fig. 4 is a front view.

Like letters of reference denote like parts in the several views.

The nature of this invention relates to a tether, and which consists of certain devices, viz: reels, on which the tether is wound by a spring, for keeping the same taut, said reels and spring being arranged in a box, having applied thereto a clamp and a pivotal point, whereby the box may be attached to a tree, post, or secured to the top of the post. Also, in combination with the box, a pole or reach for extending the tether beyond the box; all of which are constructed and operated substantially as follows:

In the drawing, A represents a case or box wherein is secured on the shaft B, journaled in the sides thereof, the grooved wheels C D E, Fig. 3, and to which is also secured the inner end of a coiled spring, F, the outer end of which is fastened to the box.

Around the groove-wheels is wound the tether or rope G, one end of which is made fast thereto, whereas the opposite end extends through the box to the outside, to be attached to the horse or other animal.

It will be obvious that on pulling upon the tether or rope G, it will unwind from the wheels, and at the same time wind up the spring upon the shaft B. On ceasing to pull upon the rope, the recoil of the spring will wind up the same as fast as the tension upon it is let up, and thereby it is kept strained, so that the animal cannot get its feet tangled therein nor over it.

For convenience, the tethering device may be secured to the top of a post, by inserting the pivotal point H, Fig. 4, therein, and thus keep the tether or rope from the ground. Now, as the tethered animal raises or lowers its head in the act of feeding, the rope will wind up or unwind more or less as the strain may be upon it, and at the same time the pivotal point H will allow the box to turn upon the post as the animal moves around it. The box, instead of being placed on the top of the post may be attached to the side of it, as shown in Fig. 4, in which I represents a section of a post with the box secured thereto by staples or loops J, fitted loosely to the post to allow the box to turn about it.

In the event of its being necessary to tether the animal to a tree, it can be done by a clamp, K, Figs. 1 and 4. Said clamp consists of two sections, a b, bound together at the top to a tree, indicated by the letter J, by a chain, L, and at the bottom by a chain, M, passing through staples N. The clamp is prevented from slipping down the tree by means of a wedge, O, Fig. 1, driven in between the tree and the clamp. The box is secured to the clamp by a band, P, passing loosely around it, and the ends thereof secured to the box by rods Q, as shown in Fig. 2. The looseness of the band around the clamp allows the box to turn freely around the tree, as the animal tethered thereto may wander, the tether being kept taut by the spring.

Should there be obstructions to a free movement of the animal around the tree, the tether is prevented from becoming entangled therein by means of a pole or reach, R, Fig. 1, one end of which is secured to the box by loops S. In the farther end of the reach is a staple, through which the tether is passed, and thereby kept elevated above the ground and beyond the obstructions, thus permitting the animal to feed without the entanglement of the rope in the obstructions.

The amount of rope the animal may be permitted to unwind is regulated by a check, which may consist of a staple inserted in the periphery of the wheel across the rope, or by a suitable click, arranged in connection with the wheel in such way as to stop its revolution when a certain amount of rope has been run off. Access is had to the inside of the box by means of the door A, which in Fig. 3 is represented as open, and a part of the side broken away, in order that the inside of the box may be seen.

What I claim as my invention, and desire to secure by Letters Patent, is—

1. The combination of the spring F, reels C D E, shaft B, rope G, box A, and clamp K, the latter secured to the box by a band, P, and rods Q, substantially in the manner and for the purpose set forth.

2. In a device for tethering animals, constructed substantially as described, the pivotal point H, and pole or reach R, attached to, and arranged in connection with, the box A, in the manner and for the purpose specified.

PHYLETUS FRANCIS.

Witnesses:
J. H. BURRIDGE,
R. B. CRAMER.